US011587095B2

(12) United States Patent
Isaak et al.

(10) Patent No.: US 11,587,095 B2
(45) Date of Patent: Feb. 21, 2023

(54) SEMANTIC SWEEPING OF METADATA ENRICHED SERVICE DATA

(71) Applicant: Microsoft Technology Licensing, LLC, Redmond, WA (US)

(72) Inventors: Donovan A. Isaak, Kenmore, WA (US); Mark R. Gilbert, Issaquah, WA (US); Vadivelan Ramalingam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 648 days.

(21) Appl. No.: 16/653,190

(22) Filed: Oct. 15, 2019

(65) Prior Publication Data
US 2021/0110403 A1  Apr. 15, 2021

(51) Int. Cl.
*G06Q 30/00* (2012.01)
*G06Q 30/016* (2023.01)
(Continued)

(52) U.S. Cl.
CPC ......... *G06Q 30/016* (2013.01); *G06F 16/215* (2019.01); *G06F 40/10* (2020.01); *H04L 51/56* (2022.05)

(58) Field of Classification Search
CPC ......... G06F 16/215; G06F 40/10; H04L 51/36
See application file for complete search history.

(56) References Cited

U.S. PATENT DOCUMENTS 7,437,338 B1   10/2008   Forman et al.
7,899,769 B2   3/2011    Jones et al.
(Continued)

FOREIGN PATENT DOCUMENTS

CN   104951432 A  *  9/2015
EP     3107026 A1    12/2016
(Continued)

OTHER PUBLICATIONS

"International Search Report and Written Opinion issued in PCT Application No. PCT/US20/052347", dated Jan. 28, 2021, 13 Pages.
(Continued)

*Primary Examiner* — Shean Tokuta
(74) *Attorney, Agent, or Firm* — Newport IP, LLC; Leonard J. Hope

(57) ABSTRACT

A system for detecting service issues within multi-sourced service data. The system includes a memory and one or more electronic processors coupled to the memory. The electronic processors are configured to receive one or more data sets in near real time, and to enrich the dataset with one or more metadata parameters, pre-clean the data within the dataset, and determine one or more data points within the dataset that are semantically similar to each other. The electronic processors are also configured to generate a similarity score for each of the semantically similar data points, and determine one or more significant clusters within the dataset within a predefined lookback window. The electronic processors are also configured to analyze the determined significant clusters to determine the existence of one or more service issues, and generate a service alert based on the analysis determining that one or more service issues are present.

20 Claims, 3 Drawing Sheets

(51) Int. Cl.
  G06F 16/215 (2019.01)
  G06F 40/10 (2020.01)
  H04L 51/56 (2022.01)

(56) References Cited

U.S. PATENT DOCUMENTS

| | | | |
|---|---|---|---|
| 8,694,304 B2 | 4/2014 | Larcheveque et al. | |
| 9,164,874 B1 * | 10/2015 | Tomay | G06F 11/366 |
| 9,245,002 B2 * | 1/2016 | Bruckner | G06F 16/90335 |
| 9,438,491 B1 * | 9/2016 | Kwok | G06F 11/3466 |
| 9,536,269 B2 | 1/2017 | Chang et al. | |
| 10,331,722 B1 * | 6/2019 | Goel | G06F 16/313 |
| 10,860,984 B1 * | 12/2020 | Ramesh | H04L 51/214 |
| 11,232,406 B1 * | 1/2022 | Michelson | G06F 40/174 |
| 2015/0161280 A1 * | 6/2015 | Pignataro | G06F 16/955 707/740 |
| 2015/0178372 A1 * | 6/2015 | Seal | G06F 16/367 707/737 |
| 2015/0180911 A1 | 6/2015 | Mavinakuli et al. | |
| 2017/0004205 A1 | 1/2017 | Jain et al. | |
| 2019/0042988 A1 * | 2/2019 | Brown | G06N 5/022 |
| 2019/0180175 A1 * | 6/2019 | Meteer | G06N 20/00 |
| 2019/0266070 A1 * | 8/2019 | Bhandarkar | G06F 11/3072 |
| 2020/0210934 A1 * | 7/2020 | Bar-on | G06Q 10/063114 |
| 2021/0110403 A1 * | 4/2021 | Isaak | H04L 51/56 |

FOREIGN PATENT DOCUMENTS

| | | | | |
|---|---|---|---|---|
| EP | 3979151 A1 * | 4/2022 | | G06Q 10/06316 |
| ES | 2715313 T3 * | 6/2019 | | G06F 19/3481 |
| JP | 2010072727 A * | 4/2010 | | |
| WO | WO-2016082575 A1 * | 6/2016 | | G06F 16/00 |
| WO | WO-2017095476 A1 * | 6/2017 | | G06F 17/2785 |
| WO | WO-2018042584 A1 * | 3/2018 | | G06F 11/366 |
| WO | 2018237098 A1 | 12/2018 | | |
| WO | WO-2021076287 A1 * | 4/2021 | | G06F 16/215 |
| WO | WO-2021150591 A1 * | 7/2021 | | G06F 16/355 |

OTHER PUBLICATIONS

"Dandelion API", Retrieved from: https://web.archive.org/web/20190420194154/https:/dandelion.eu//, Apr. 20, 2019, 5 Pages.

"How can we Use Social Media Data to Detect Customer Issues Sooner?", Retrieved from: https://www.sas.com/content/dam/SAS/en_us/doc/solutionbrief/manufacturing-social-media-data-105524.pdf, Retrieved Date: Jul. 9, 2019, 2 Pages.

Bannister, Kristian, "Research: How to Mine Social Media for Customer and Product Feedback", Retrieved from https://www.brandwatch.com/blog/research-how-to-gain-product-feedback-in-hours-not-weeks/, May 1, 2015, 15 Pages.

Ly, et al., "Product Review Summarization based on Facet Identification and Sentence Clustering", In Journal of Computing Research Repository, Oct. 7, 2011, 10 Pages.

Mrudula, et al., "An Efficient Feedback Based Trust Management Framework for Cloud Computing", In International Journal of Computer Science & Communication Networks, vol. 7, Issue 5, Oct. 2017, pp. 147-151.

* cited by examiner

SEMANTIC SWEEPING OF METADATA ENRICHED SERVICE DATA

SUMMARY

Software has become both more complex and commonplace. As a consequence, providing support for large scale software service has also become difficult. Support for large, or small, software services is important, as the features and functions of the software service may not always perform up to the expectations of users or developers. Generally, when one or more aspects of the software service does fall below these expectations, users provide feedback to the developer in different ways. This feedback may be referred to as "service data." The large scale of software (multiple countries, multiple versions, large pool of users, etc.) has made collecting and analyzing service data more difficult. For example, service data is often received from multiple sources, such as via service calls, on-line support, social media, etc. As a consequence, the service data is often related to numerous and varied issues, resulting in large quantities of disjointed data which must be analyzed to determine what the actual service issues are, and their associated importance. Accordingly, it would be advantageous to identify and distribute service issues based on the service data to allow developers to more quickly fix or address issues in the software. Thus, a system and method for condensing service data and determining service issues, are described below.

For example, one embodiment provides a system for detecting service issues within multi-sourced service data. The system includes a memory for storing executable program code, and one or more electronic processors coupled to the memory. The electronic processors are configured to receive one or more data sets in near real time, wherein the datasets include service data associated with one or more software platforms. The electronic processors are also configured to enrich the dataset with one or more metadata parameters, pre-clean the data within the dataset, and determine one or more data points within the dataset that are semantically similar to each other. The electronic processors are also configured to generate a similarity score for each of the semantically similar data points, and determine one or more significant clusters within the dataset within a predefined lookback window, wherein the significant clusters have a number of semantically similar data points having a similarity score above a predefined value. The electronic processors are also configured to analyze the determined significant clusters to determine the existence of one or more service issues, wherein the analysis analyzes the metadata parameters associated with the data points within the significant clusters along with one or more characteristics of the significant clusters, and generate a service alert based on the analysis determining that one or more service issues are present.

Another embodiment includes a method for detecting service issues within multi-sourced service data. The method includes receiving, at a computing device, a dataset from one or more sources, wherein the dataset comprises service data associated with one or more software platforms, an enriching, via the computing device, the dataset with one or more metadata parameters. The method further includes, via the computing device, pre-cleaning the data within the dataset, generating a similarity score for each of the semantically similar data points; and determining one or more significant clusters within the dataset within a predefined lookback window, wherein the significant clusters have a number of semantically similar data points having a similarity score above a predefined value. The method also includes analyzing, via the computing device, the determined significant clusters to determine the existence of one or more service issues, wherein the analysis analyzes the metadata parameters associated with the data points within the significant clusters along with one or more characteristics of the significant clusters. The method also includes generating, via the computing device, a service alert based on the analysis determining that one or more service issues are present.

Another embodiment includes a system for detecting service issues within multi-sources data. The system includes a memory for storing executable program code, and one or more electronic processors coupled to the memory and the user interface. The electronic processors are configured to receive one or more data sets in near real time, wherein the datasets include service data associated with one or more software platforms. The electronic processors are also configured to enrich the dataset with one or more metadata parameters, pre-clean the data within the dataset, and determine one or more data points within the dataset that are semantically similar to each other. The electronic processors are also configured to generate a similarity score for each of the semantically similar data points, and determine one or more significant clusters within the dataset within a predefined lookback window, wherein the significant clusters have a number of semantically similar data points having a similarity score above a predefined value. The electronic processors are also configured to analyze the determined significant clusters to determine the existence of one or more service issues, wherein the analysis analyzes the metadata parameters associated with the data points within the significant clusters along with one or more characteristics of the significant clusters, and generate a service alert based on the analysis determining that one or more service issues are present. The electronic processors are also configured to set the predefined lookback window to a second predetermined time period, wherein the second predefined time period is a longer time period than the first predefined time period, and generate service trend data based on the second predefined time period.

These and other features, aspects, and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
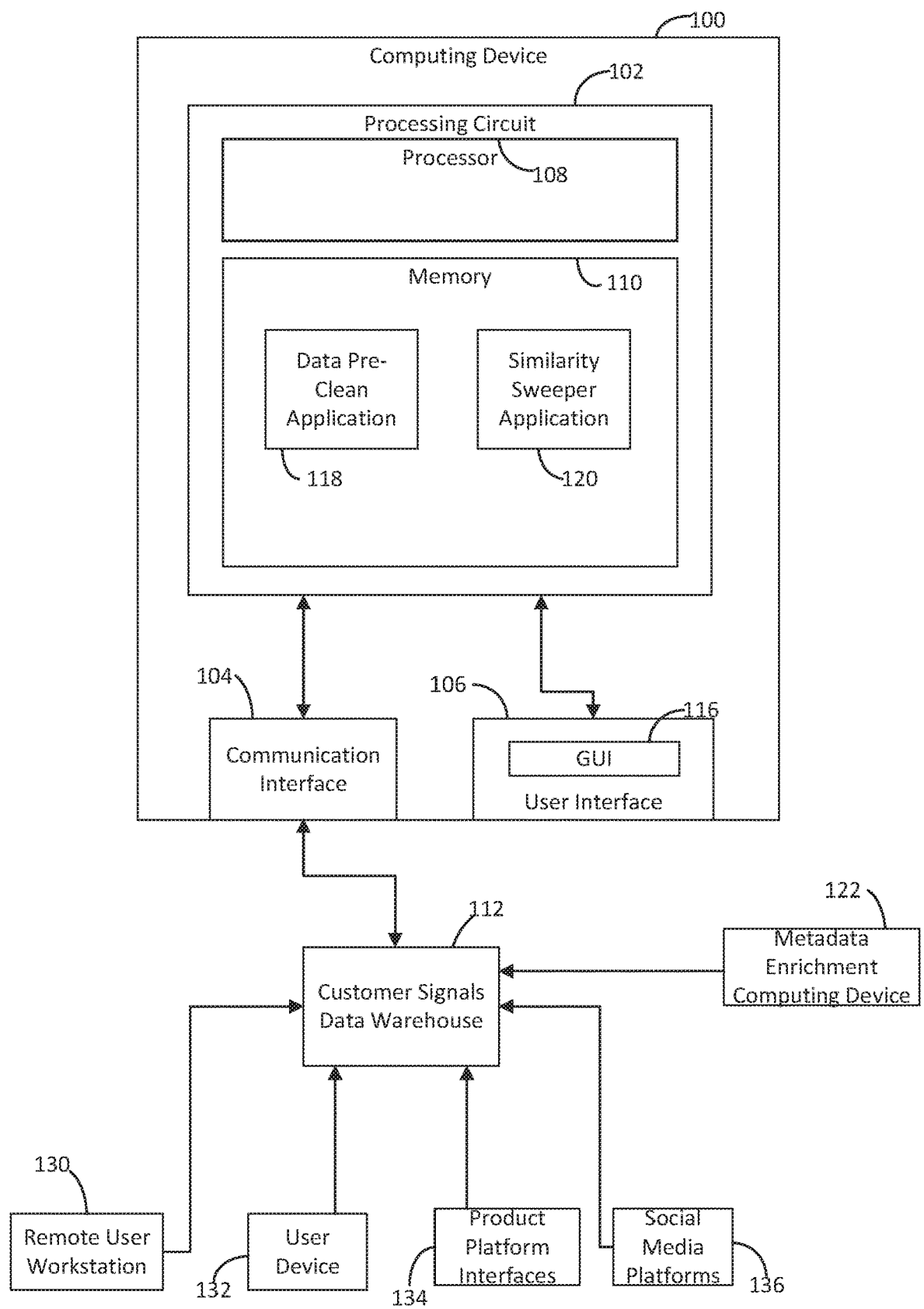
FIG. 1 is a block diagram of a computing device, according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. In addition, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Relational terms such as first and second, top and bottom, and the like may be used herein solely to distinguish one entity or action from another entity or action without necessarily requiring or implying any actual such relationship or order between such entities or actions.

Software companies may receive a large amount of user feedback regarding the use of their software products. In some cases, the data may come from multiple platforms (for example, service calls, web-based service centers, social media sites (for example, Twitter), software forums, and the like. This data, particularly when provided directly by a user, is often provided using non-uniform syntax. For example, users may use similar words and phrases to describe the issue, but even slight variations can result in large amount of disparate data. Systems and methods describe herein, among other things, analyze the data group and analyze the provided service data, thereby allowing developers to more quickly and accurately determine where there are problems, and determine proper corrective actions.

Turning now to FIG. 1, a block diagram of an example computing device 100 is shown. The computing device 100 may be a personal computer, a laptop computer, a tablet computer, a mobile device (for example, a smartphone, a dedicated-purpose computing device, etc.), a server, a cloud-based computing device, or other applicable devices. In the example provided in FIG. 1, the computing device 100 includes a processing circuit 102, a communication interface 104, and a user interface 106. The processing circuit 102 includes an electronic processor 108 and a memory 110. The processing circuit 102 may be communicably connected to one or more of the communication interface 104 and the user interface 106. The electronic processor 108 may be implemented as a programmable microprocessor, an application specific integrated circuit (ASIC), one or more field programmable gate arrays (FPGA), a group of processing components, or with other suitable electronic processing components.

The memory 110 (for example, a non-transitory, computer-readable medium) includes one or more devices (for example, RAM, ROM, Flash memory, hard disk storage, etc.) for storing data and/or computer code for completing or facilitating the various processes, layers, and modules described herein. The memory 110 may include database components, object code components, script components, or other types of code and information for supporting the various activities and information structure described in the present application. According to one example, the memory 110 is communicably connected to the electronic processor 108 via the processing circuit 102 and may include computer code for executing (for example, by the processing circuit 102 and/or the electronic processor 108) one or more processes described herein.

The communication interface 104 is configured to facilitate communication between the computing device 100 and one or more external devices or systems, for example, those shown in FIG. 1. The communication interface 104 may be or include wireless communication interfaces (for example, antennas, transmitters, receivers, transceivers, etc.) for conducting data communications between the computing device 100 and one or more external devices, for example, a customer signals data warehouse, or other remote services. In some embodiments, the communication interface 104 utilizes one or more wireless communication protocols. The communication interface 104 may additionally be or include wired communication interfaces to facilitate wired communication between the computing device 100 and one or more other devices or systems, for example, those described in FIG. 1.

The user interface 106 provides a mechanism through which a user interacts with the computer device 100, for example, by receiving user inputs. The user interface 106 may include a keyboard, a mouse, a trackpad, a touchscreen (for example, resistive, capacitive, inductive, etc.), or other known input mechanism. The user interface 106 may also include a display to output in a visible manner various data generated by the computing device 100. The user interface 106 may also display a graphical user interface ("GUI"), for example, GUI 116, generated by the computing device 100. The GUI 116 includes elements configured to receive user inputs (for example, via a click, selection, or text entry) and output information (for example, via graphical elements, icons, menus, dialog boxes, etc.) in a manner that is perceptible to a user. In some embodiments, the electronic processor 108 may be configured to execute code from the memory 110 to generate the GUI 116 on the user interface 106. Additionally, the electronic processor 108 may be configured to receive and process inputs received via the GUI 116.

As described above, the memory 110 may be configured to store various processes, layers, and modules, which may be executed by the electronic processor 108 and/or the processing circuit 102. In one embodiment, the memory 110 includes a data pre-clean application 118 and a similarity sweeper application 120. The data pre-clean application 118 may be configured to pre-clean data received from the customer signals data warehouse 112. In one example, the data pre-clean application 118 is configured to convert received data from the customer signals data warehouse 112 into data that is readable by the similarity sweeper application 120. In one instance, the data pre-clean application 118 converts all text to a common format, converts all text to lower case, removes words that are less than three characters, only considers sentences that contain more than three words, or performs a combination of the foregoing. The similarity sweeper application 120 is configured to analyze data from the customer signals data warehouse 112, that has been pre-cleaned by the data pre-clean application 118, and to semantically group data which is then output to one or more users to aid in identifying potential service issues within a given software platform. The data pre-clean application 118 and the similarity sweeper application 120 are discussed in more detail below.

The customer signals data warehouse 112 is configured to receive service data from various other devices and/or systems. In the example shown in FIG. 1, the customer signals data warehouse 112 is configured to receive data from a remote user workstation 130, a user device 132, a product platform interface 134 and/or one or more social media platforms 136. The remote user workstation 130, user device 132, product platform interface 134 and social media platforms 136 may be configured to provide service data to the customer signals data warehouse 112 in the form of textual data input by a user. This textual data may be representative of one or more issues or requests that the user has regarding a specific software platform. In some embodiments, the textual data is input by a user of the software platform, for example via the user device 132, the product platform interfaces 134, and or the social media platforms 136. However, in other embodiments, the textual data is input by an administrator or service technician associated with the software platform, for example an IT or technical support specialist. In certain embodiments, the textual data is entered directly (for example, via the user device 132 or via the product platform interface 134), or extracted (for example, via raw data from social media platforms 136).

In one embodiment, the customer signals data warehouse 112 is configured to enrich the data provided by the remote user workstation 130, the user device 132, the product platform interfaces 134 and/or the social media platforms 136 with metadata. In one embodiment, the metadata is provided by the metadata enrichment computing device 122. In one embodiment, the metadata enrichment computing device 122 is a server. In other embodiments, the metadata enrichment computing device 122 is a cloud-based service. The metadata enrichment computing device 122 is configured to provide metadata related to the data received by the remote user workstation 130, the user devices 132, the product platform interfaces 134 and/or the social media platforms.

In one embodiment, the metadata enrichment computing device 122 provides topographical data related to data received by the customer signals data warehouse 112, which can then be appended or associated with the data. Topographical data may include a geographic location of the tenant or hosting server associated with the received data, customer release data, for example, whether the customer is on a first release, and/or other applicable topographical data. The metadata enrichment computing device 122 may also provide other metadata associated with the received data, such as service data (for example, historical service information, service notes, etc.), customer usage, known application of software, version of the software associated with the received data, tenant data, etc.

The metadata may be applied to all or some of the data received by the customer signals data warehouse. In one embodiment, the metadata enrichment computing device 122 is operably connected to one or more databases and/or computing system and the metadata enrichment computing device 122 determines and applies metadata to the data received by the customer signals data warehouse. In some embodiments, the metadata enrichment computing device 122 determines and applies metadata to the data received by the customer signals data warehouse 112 using one or more sub-routines. One sub-routine may determine and apply metadata based on what is known about a user or tenant/user group that provided the data, for example using topology metadata, most recent code changes made to a service endpoint a user is communicating with, and/or any logs or telemetry data about the usage of a user. In some examples, the determination and application of metadata based on user or tenant/user group data requires the data to come from an authenticated channel to ensure that the metadata is properly applied. Other sub-routines may determine and apply metadata based on words or phrases within the data itself. The determination and application of metadata based only on the words or phrases within the data can allow metadata to be applied regardless of the source data. In some embodiments, rules may be applied to determine if new records of data is added to the customer signals data warehouse 112 to avoid adding metadata to old data.

Figure 2:
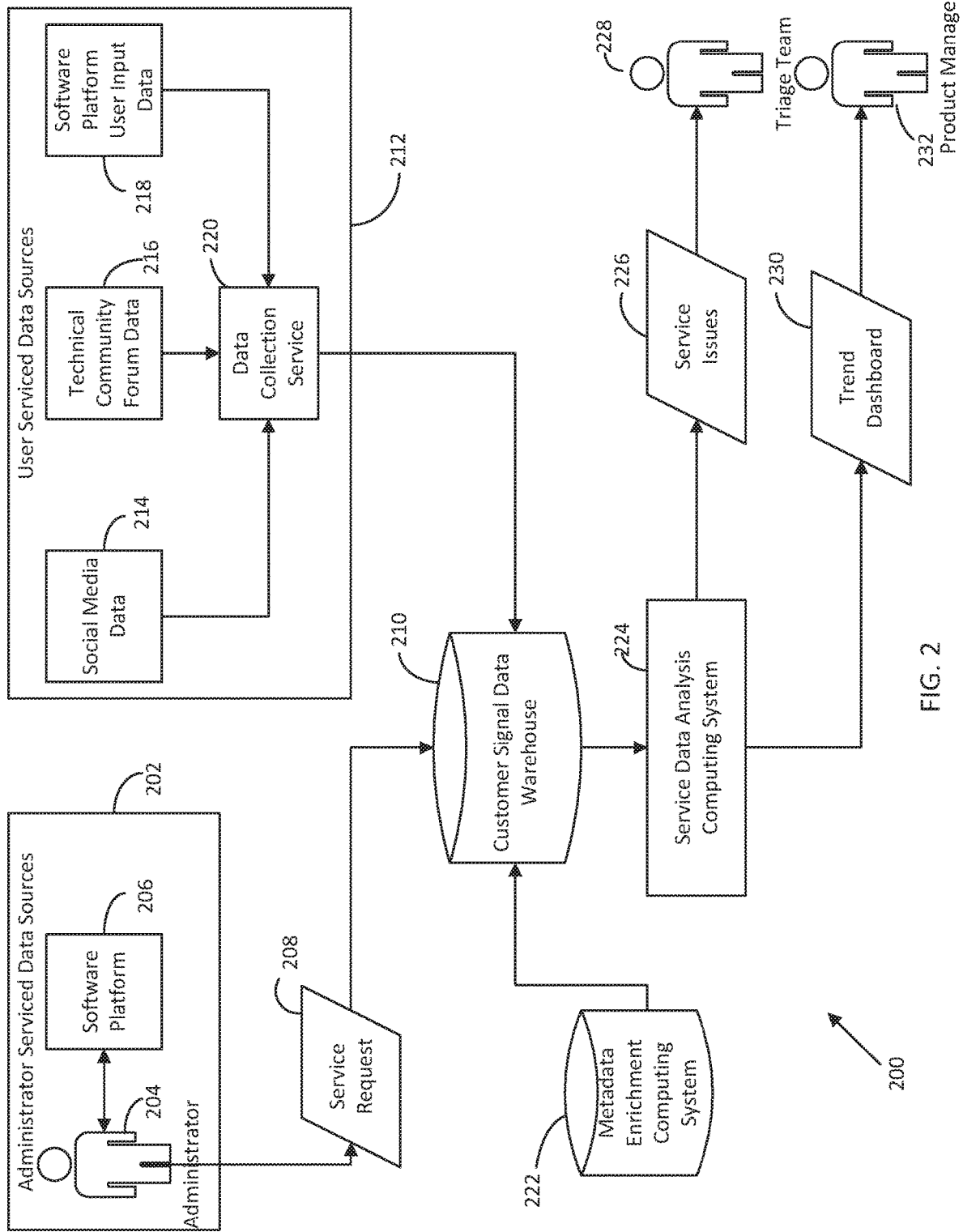
FIG. 2 is a flow chart illustrating a process for performing differential topic extraction, according to some embodiments.

Turning now to FIG. 2, a system 200 is shown that reflects the data flows described above. It is understood that the devices and data sources described in FIG. 2 may be the same or similar to those described above in regards to FIG. 1. In the example provided in FIG. 2, data is generated via one or more administrator serviced data sources 202. The administrator serviced data sources may include data sources that are entered via one or more administrators 204 associated with a software platform 206. The administrators 204 may be IT specialists or other technical support persons who are responsible for receiving feedback (for example, issues, service requests, complaints, etc.) associated with the software platform 206. The software platform 206 may be one or more cloud based software programs, one or more on-premises software programs, local, consumer software programs, or a combination thereof. In one instance, the software platform includes Office 365 or Sharepoint from Microsoft®. However, it is understood that the software platform 206 may include other collaboration platform software, or other software suites offered as a service, programs, or platforms capable of performing functions and features described herein.

In one example, the data collected from the administrator serviced data sources 202 is converted into service requests 208, and provided to a customer signals data warehouse 210. In some embodiments, the data is provided to the customer signals data warehouse in real time, or near real time. It is contemplated that the customer data warehouse 210 may be similar in structure and function to the customer data warehouse 112, described above. In one embodiment, the service requests 208 are automatically generated and provided to the customer signals data warehouse 210. However, in other embodiments, one or more administrators manually generate the service requests 208 based on the data received via the administrator serviced data sources 202. As stated above, in some instances, the service requests are provided to the customer signals data warehouse 210 for additional analysis, as will be described in more detail below.

Service data may also be provided via user serviced data sources 212. User serviced data sources 212 may be any data source where a user can input information related to an issue associated with a software platform, for example the software platforms described above. Examples of user serviced data sources include, for example, social media data 214, technical community forum data 216, and software platform user input data 218. Social media data may include information provided via one or more social media platforms, for example Twitter®, Facebook®, and the like. Technical community forum data 216 may be provided via various technical community forums, for example message boards or other communities that are associated with the software platform, and/or a provider of the software platform. Software platform user input data 218 may be provided via one or more user interfaces within a software platform. For example, software platforms may include options to allow a user to report issues, generate issue messages, and the like. Thus, the software platform data 218 is generated within the software platform. In some embodiments, the software platform data 218 is input based on a user interaction. However, in some embodiments, certain software platform data 218 is automatically generated.

In some examples, one or more of the user serviced data sources 212 are monitored via a data collection service 220. The data collection service 220 is used to access data from one or more of the user serviced data sources 212. For example, the data collection service 220 polls one or more of the user serviced data sources 212 based on one or more criteria, for example specific keywords, software platforms mentioned or "tagged," and the like. In some embodiments the technical community forums are configured to automatically provide data to the data collection service 220 based on what specific forum was commented on, for example via the technical communities forum data 216. In some instances, forums are associated with a given software platform, and the service information provided by users on that particular forum is automatically provided to the data collection service 220 along with data associated with the service information with a particular software platform or known issue within the software platform. Upon collecting the data from the user serviced data sources 212, the user service data is provided to the customer signals data warehouse 210.

As described above, the customer signals data warehouse 210 is in communication with a metadata enrichment computing device 222. The metadata enrichment computing device 222 provides metadata enrichment to the data collected by the customer signals data warehouse 210. Accordingly, the metadata enrichment computing device 222 may be similar to the metadata enrichment computing device 122 described above. As described above, the metadata enrichment computing device 222 is configured to add metadata to the data received by the customer signals data warehouse 210, for example topographical data, version data, tenant data, etc.

The metadata enriched data is then provided to a service data analysis computing system 224. In one embodiment, the service data analysis computing system 224 is configured to analyze the metadata enhanced service data to determine both service issues, as well as potential long term trends associated with service of a software platform. In one embodiment, the service data analysis computing system 224 is based on the computing device 100 described above. For example, the service data analysis computing system 224 may include both a data pre-clean application and a similarity sweeper application, for example described above. The process for analyzing the data will be described in more detail below.

In one embodiment, the service data analysis computing system 224 is configured to determine service issues based on the metadata enhanced service data. For example, the service issues may be based on the service data analysis computing system 224 determining that there is a predefined number of similar data points that are received within a predefined time frame. The service data analysis computing system 224 may output one or more service issues 226 to be provided to a triage team 228. The outputted service issues 226 may be generated as e-mails, internal messages (for example, for transmission via an internal messaging or tracking system), SMS/MMS messages, and other such applicable communication methods. The triage team may be one or more persons within an IT team that can evaluate the service issues output by the service data analysis computing system 224. In other embodiments, the triage team may be an automated system for ranking received service issues. For example, the service issues may be evaluated based on severity or ease of fix, and appropriate action taken, for example directing the service issue to service personnel to be fixed, or escalating the issue to another team.

In other embodiments, the service data analysis computing system 224 outputs analyzed data to a trend dashboard 230 to determine long term trends. In this case, the window is expanded to a longer period than the period associated with the service issues. For example, the service issues may only include data from a time period of twenty-four hours. In contrast, the long term trends may evaluate data from a time period of three to six months. However, it is contemplated that other time periods may also be used. These long term trends may be provided to a program manager who may use the data to improve user experiences, for example by enriching insights (for example, help topics), fixing or modifying documentation, improving processes, deflecting future service requests, and/or improve customer/user service.

Figure 3:
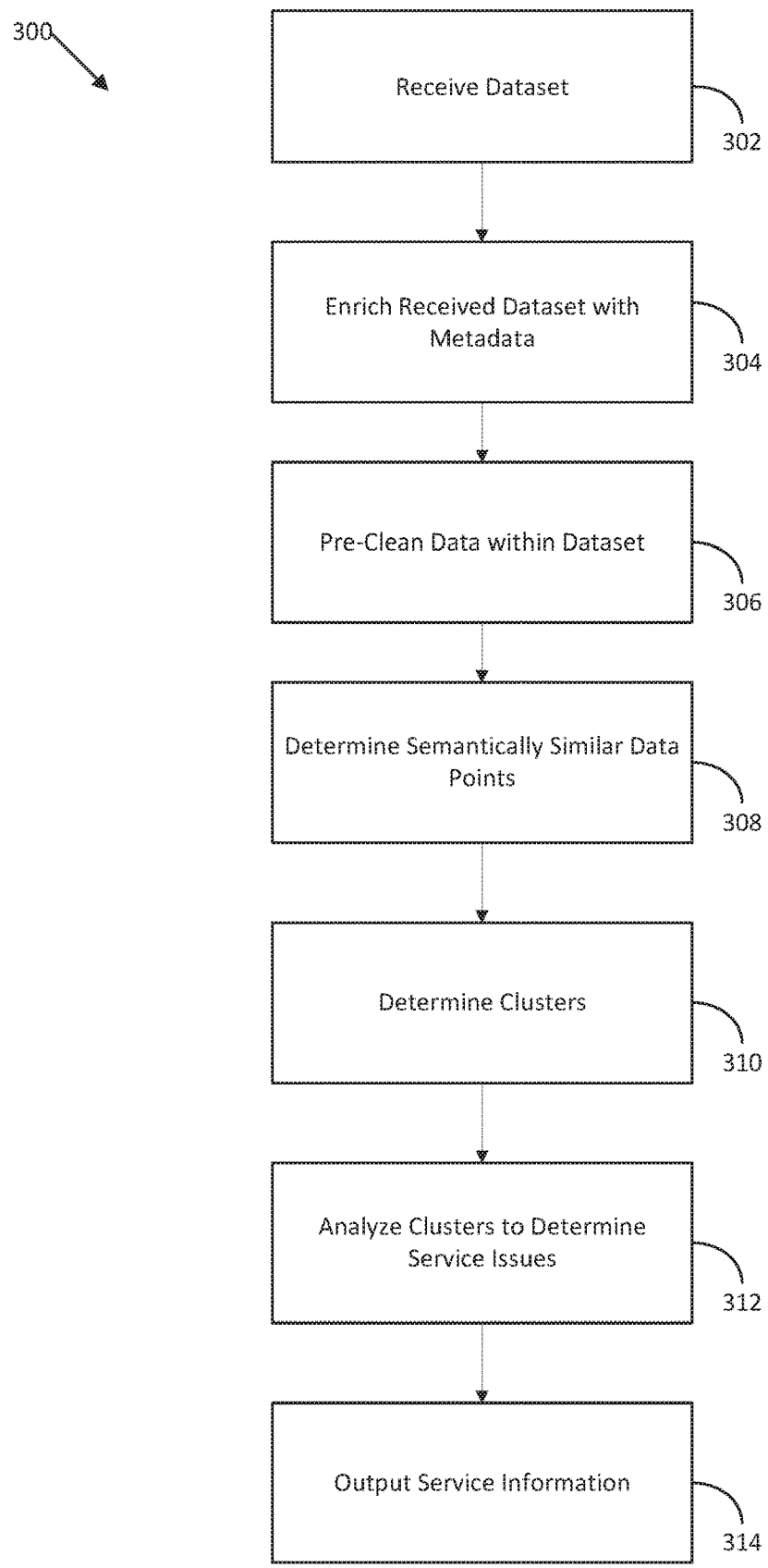
FIG. 3 is flow chart illustrating a process for analyzing service data from multiple datasets is shown, according to some embodiments.

Turning now to FIG. 3, an example process 300 for extracting service data from multiple datasets is shown. It is contemplated that the process 300 is performed by one or more of the devices or systems described above. At process block 302, a number of datasets are received by the customer signals data warehouse 112. As described above, the datasets may be received from multiple sources, for example the administrator serviced data sources 202 and/or the user-serviced data sources 212. Example datasets may include service request data from the administrator serviced data sources 202. Other example datasets can include extracted datasets from various user-serviced data sources 212, including social media data sources 214, technical community forum data 216, and/or software platform user input data 218. In one embodiment, data from the above described sources may all be combined, for example at the customer signals data warehouse.

At process block 304, the received datasets are enriched using metadata associated with the datasets. The metadata can be topographical metadata, tenant metadata, version metadata, etc. In one embodiment, the metadata is combined with the dataset based on information provided by a metadata enrichment computing device, for example described above. The metadata may be used to provide additional references to the dataset by providing information for example version types, release of software, user information, geographic information (for example, location where software is being used, geographic location of the server hosting the software platform, or a version of the software platform being used, and the like), and other applicable metadata.

At process block 306, the dataset is pre-cleaned, for example, via the data pre-clean application 118, described above. The data pre-clean application 118 may first convert all text to a common format. The data pre-clean application 118 may then convert all text to lowercase letters, remove words that are below a certain number of letters (for example, three), and remove sentences having less than three words. Other pre-cleaning activities may include remove vulgar or obscene words, removing text in different languages, converting all text to the same font, removing all punctuation, and the like.

After the datasets have been pre-cleaned, semantically similar data points are determined at process block 308. In one embodiment, the similarity sweeper application 120 determines semantically similar data points within the dataset. The semantically similar data points may be determined by identifying words or sentences with semantic similarity and attempting to use the meaning of the sentences to determine similarity. This combination of combining sematic similarity with possible sentence meaning allows for the similarity sweeper application 120 to determine the semantically similar data points more accurately. In some embodiments, a similarity score is applied to the various data point combinations to reflect a strength of similarity. For example, a higher similarity score can indicate a stronger similarity between data points. Conversely, a lower similarity score can indicate a weaker similarity between the data points.

Once the semantically similar data points have been determined, one or more data clusters are determined at process block 310. Similar to above, the similarity sweeper application 120 can determine the data clusters. However, in some embodiments, the similarity sweeper application 120 may work in conjunction with the customer signals data warehouse 112 to determine the data clusters. In one embodiment, the clusters are determined based on a specified lookback window (i.e. how far back in the dataset to go). In one example, the lookback window is 24 hours. In other examples, the lookback window is 12 hours. However, other lookback window time frames are also considered. In other examples, the lookback windows may be over longer periods of time, for example 3-6 months, a year, or more. This can allow for long term trends to be determined. In one embodiment, the clusters may be based on a mixture of the lookback window, and a similarity score of the similar data points exceeding a user defined value. For example, if the similarity score scale in a given application is 1-10, the clusters may require only data with a 24 hour lookback window that has a similarity score of 6 or higher. However, it is understood that a user may be able to set both the required similarity score and the lookback windows as required. Clusters of data that meet the user requirements may be considered "significant" clusters. In some embodiments, the similarity sweeper application 120 and/or the customer signals data warehouse 112 can generate categories for the determined significant clusters. For example, the clusters may be grouped according to the semantic data associated with the data points. For example, if the data points in a significant cluster are determined to be associated with an e-mail issue, the cluster may be classified "e-mail." In other examples, the significant clusters may be classified based on the type of issue, the software associated with the issue, specific functionality, and the like.

Once the clusters, and specifically the significant clusters have been determined, the clusters are then analyzed at process block 312 to determine if there are service issues of note in the clusters. In one embodiment, the similarity sweeper application 120 and/or the customer signals data warehouse 112 performs the analysis. In one embodiment, the significant clusters are additionally analyzed based on the applied metadata described above. This can provide additional granularity between the significant clusters by additionally limiting what data is applicable within the significant cluster. For example, by using the metadata, the relationship between the data points in the clusters can be refined such that time and similarity score are not the only conditional factors. Rather, by including metadata for example topology, versions, builds, geographic location of the user submitting the data, etc., in the analysis, irrelevant, or less relevant, data points can be excluded from the clusters to further focus the clusters on specific issues.

Once the clusters are further analyzed based on the metadata, they can then be further analyzed to determine if there is a service issue. In some embodiments, the similarity sweeper application 120 and/or the customer signals data warehouse 112 may determine that there is a service issue when the amount of data points within a cluster for a given lookback window exceeds a predetermined value. For example, if there are 10 users reporting the same issues (for example, 10 data points within the same cluster) within 24 hours, the similarity sweeper application 120 and/or the customer signals data warehouse 112 may determine that there is a service issue. The above values are for example purposes only, and it is understood that the thresholds for determining service issues can be modified as needed by the appropriate personnel. For example, in some cases a user may want understand how issues, or potential issues, trend over time. In this case, the user may extend the lookback window to a much longer period, for example three months, six months, one year, and so on. This can allow for deeper trends within a software platform to be determined.

Once the service issues are determined, the service information is output at process block 314. Outputting service information may include generating messages (for example, e-mails, text messages, instant messages, internal messaging system messages, etc.) to one responsible personnel that there is a detected service issue. For example, the service information may be output to personnel who are responsible for a particular software platform, a feature of the software platform, or a geographical region that is associated with the particular service issue. This can allow the responsible personnel to fix or escalate an issue. In some instances, the service issue may automatically be escalated to more senior personnel based on the data in the cluster being determined to exceed an escalation threshold. This could be based on the number of reports within the lookback window in some embodiments. In other embodiments, the issue may be escalated based on the metadata associated with the data points. For example, if there is a concentration of reported issues associated with a given release or a geographic location (for example, the geographic location of the server hosting a software platform where the issue is reported), the matter may be escalated, or sent to specific teams or personnel associated with those releases or locations.

In other examples where the service issues are long term data issues, the service information may be output to an issue trend dashboard reviewable by product responsible personnel, for example product managers. As described above, the issue trends may be used to help enrich insights, fix documentation associated with a software platform, improve processes, defect service requests, and/or improve customer service.

What is claimed is:

1. A system for detecting service issues within multi-sourced service data, the system comprising:
a memory for storing executable program code; and
one or more electronic processors coupled to the memory, the electronic processors configured to:
receive one or more datasets in near real time, wherein the datasets include service data associated with one or more software platforms;
enrich the dataset with one or more metadata parameters;
pre-clean the data within the dataset;
determine one or more data points within the dataset that are semantically similar to each other;
generate a similarity score for each of the semantically similar data points;
determine one or more significant clusters within the dataset within a predefined lookback window, wherein the significant clusters have a number of semantically similar data points having a similarity score above a predefined value;
analyze the determined significant clusters to determine the existence of one or more service issues, wherein the analysis analyzes the metadata parameters associated with the data points within the significant clusters along with one or more characteristics of the significant clusters; and
generate a service alert based on the analysis determining that one or more service issues are present.

2. The system of claim 1, wherein the generated service alert is automatically transmitted to a user based on the user being responsible for a product associated with the significant cluster.

3. The system of claim 2, wherein the generated service alert is automatically transmitted to the user by one or more of an e-mail, an instant message, a text message, or an internal messaging system.

4. The system of claim 1, wherein the metadata parameters comprise one or more of software version data, hardware version data, and tenant service data associated with the received dataset.

5. The system of claim 1, wherein the metadata parameters include a geographical location of a server running a software platform associated with one or more of the received datasets.

6. The system of claim 1, wherein the characteristics of the significant clusters comprises a number of data points in the significant cluster that are within the predefined lookback window exceeding a predefined value.

7. The system of claim 6, wherein the predefined value is 10 and the predefined lookback window is 24 hours.

8. The system of claim 1, wherein the datasets are received from one or more of an administrator service entry system, a social media platform, a user input within a software platform, and a technical community forum.

9. The system of claim 1, wherein the electronic processors are further configured to:
set the predefined lookback window to an extended time period; and
generate service trend data based on the extended time period.

10. The system of claim 9, wherein the extended time period is six months.

11. A method for detecting service issues within multi-sourced service data, the method comprising:
receiving, at a computing device, a dataset from one or more sources, wherein the dataset comprises service data associated with one or more software platforms;
enriching, via the computing device, the dataset with one or more metadata parameters;
pre-cleaning, via the computing device, the data within the dataset;
determining, via the computing device, one or more data points within the dataset that are semantically similar to each other;
generating, via the computing device, a similarity score for each of the semantically similar data points;
determining, via the computing device, one or more significant clusters within the dataset within a predefined lookback window, wherein the significant clusters have a number of semantically similar data points having a similarity score above a predefined value;
analyzing, via the computing device, the determined significant clusters to determine the existence of one or more service issues, wherein the analysis analyzes the metadata parameters associated with the data points within the significant clusters along with one or more characteristics of the significant clusters; and
generating, via the computing device, a service alert based on the analysis determining that one or more service issues are present.

12. The method of claim 11, wherein the generated service alert is automatically transmitted to a user based on the user being responsible for a product associated with the significant cluster.

13. The method of claim 12, wherein the generated service alert is automatically transmitted to the user by one or more of an e-mail, an instant message, a text message, or an internal messaging system.

14. The method of claim 11, wherein the metadata parameters comprise one or more of software version data, hardware version parameters, and tenant service data associated with the data within the received dataset.

15. The method of claim 11, wherein the metadata parameters comprise a geographical location of a server running a software platform associated with one or more of the received datasets.

16. The method of claim 11, wherein the characteristics of the significant clusters comprises a number of data points in the significant cluster that are within the predefined lookback window exceeding a predefined value.

17. The method of claim 11, wherein the datasets are received from one or more of an administrator service entry system, a social media platform, a user input within a software platform, and a technical community forum.

18. The method of claim 11, further comprising:
setting, via the computing device, the predefined lookback window to an extended time period; and
generating, via the computing device, service trend data based on the extended time period.

19. A system for detecting service issues within multi-sourced service data, the system comprising:
a memory for storing executable program code; and
one or more electronic processors coupled to the memory and the user interface, the electronic processors configured to:
receive one or more datasets in near real time, wherein the datasets include service data associated with one or more software platforms;

enrich the dataset with one or more metadata parameters;
pre-clean the data within the dataset;
determine one or more data points within the dataset that are semantically similar to each other;
generate a similarity score for each of the semantically similar data points;
determine one or more significant clusters within the dataset within a lookback window set to a first predefined time period, wherein the significant clusters have a number of semantically similar data points having a similarity score above a predefined value;
analyze the determined significant clusters to determine the existence of one or more service issues, wherein the analysis analyzes the metadata parameters associated with the data points within the significant clusters along with one or more characteristics of the significant clusters;
generate a service alert based on the analysis determining that one or more service issues are present;
set the predefined lookback window to a second predefined time period, wherein the second predefined time period is a longer time period than the first predefined time period; and
generate service trend data based on the second predefined time period.

20. The system of claim 19, wherein the first predefined time period is 24 hours and the second predefined time period is 6 months.

* * * * *